Aug. 11, 1942.   P. E. KOSTER   2,292,451
AIRCRAFT INDICATING DEVICE
Filed Dec. 22, 1939   2 Sheets-Sheet 1

INVENTOR
Paul Edward Koster
BY
Stephen Cerstvik
ATTORNEY

Aug. 11, 1942.  P. E. KOSTER  2,292,451
AIRCRAFT INDICATING DEVICE
Filed Dec. 22, 1939   2 Sheets-Sheet 2

INVENTOR.
Paul Eduard Koster
BY
Stephen Gerstvik
ATTORNEY.

Patented Aug. 11, 1942

2,292,451

UNITED STATES PATENT OFFICE 2,292,451

AIRCRAFT INDICATING DEVICE

Paul Eduard Koster, Berlin-Frohnau, Germany, assignor to Siemens Apparate und Maschinen Gesellschaft mit beschränkter Haftung, Berlin, Germany, a corporation of Germany Application December 22, 1939, Serial No. 310,620
In Germany December 30, 1938

4 Claims. (Cl. 33—204)

This invention relates to attitude indicating means for vehicles, and more particularly to such means for aiding aircraft in blind flying.

Devices have heretofore been proposed for indicating inclinations of an aircraft from a reference plane, and also for indicating the angular velocity of deviations of an aircraft from a predetermined course, a gyroscopic horizon being employed for establishing said reference plane. During a turn or a curved flight path of the aircraft, in which the vertical or normal axis of the craft should coincide with the apparent vertical, the latter being established by the path speed and the angular speed of the aircraft, the above mentioned means will indicate the inclination of the transverse axis of the plane relative to a true horizon. During a climb or a descent, either of which requires a specific "angle of incidence" of the craft, an indication of the attitude responsive means will represent the inclination of the longitudinal axis of the craft relative to the true horizon. If a pilot intends to maintain a flying attitude in which suitable indicating pointers of the apparatus are deflected from a zero position, he can do so by maintaining said pointers in their deflected positions. However, when the pointers are deflected deviations in the magnitude of the pointer deflections can be determined only by estimate, the latter, of course, being subject to error. Structures of the type above described are well-known as evidenced by applicant's issued Patent No. 2,160,970, dated June 6, 1939. In addition to this disadvantage, devices heretofore proposed have required scales of undesirable size.

One of the objects of the present invention is to provide a novel attitude indicating device for vehicles by which a predetermined attitude of the vehicle can be accurately maintained and in this respect the present invention differs from that disclosed and claimed in the above referred to issued Patent No. 2,160,970.

Another object of the invention is to provide apparatus of the above character which occupies a minimum amount of space.

A further object is to provide novel attitude indicating means for aircraft which avoids the necessity for a pilot making an estimation of the deviation of the craft from a desired attitude.

The above and further objects and novel features will more fully appear from the detailed description when the same is read in connection with the accompanying drawings. It is to be expressly understood, however, that the drawings are for purposes of illustration only and are not intended as a definition of the limits of the invention, reference for this latter purpose being had primarily to the appended claims.

In the drawings, wherein like reference characters refer to like parts throughout the several views, Fig. 1 is a schematic view partly isometric and partly in section of one embodiment of the invention;

The form of the invention illustrated in the accompanying drawings, by way of example, comprises a gyroscopic horizon for a vehicle, means for indicating longitudinal and transverse inclinations of the vehicle, and means for operatively connecting the horizon and the indicating means, and suitable control members for adjusting the position of the indicating means. Course responsive means are also provided, which are in operative interconnection with an indicating pointer therefor, said pointer being movable between predetermined limits. In order that the last mentioned indicating pointer be maintainable at a desired position within said limits, means are provided in said operative interconnection for adjusting the position of the pointer, the last named means being operatively connected to and governed by one of the above mentioned control members.

Figure 1:
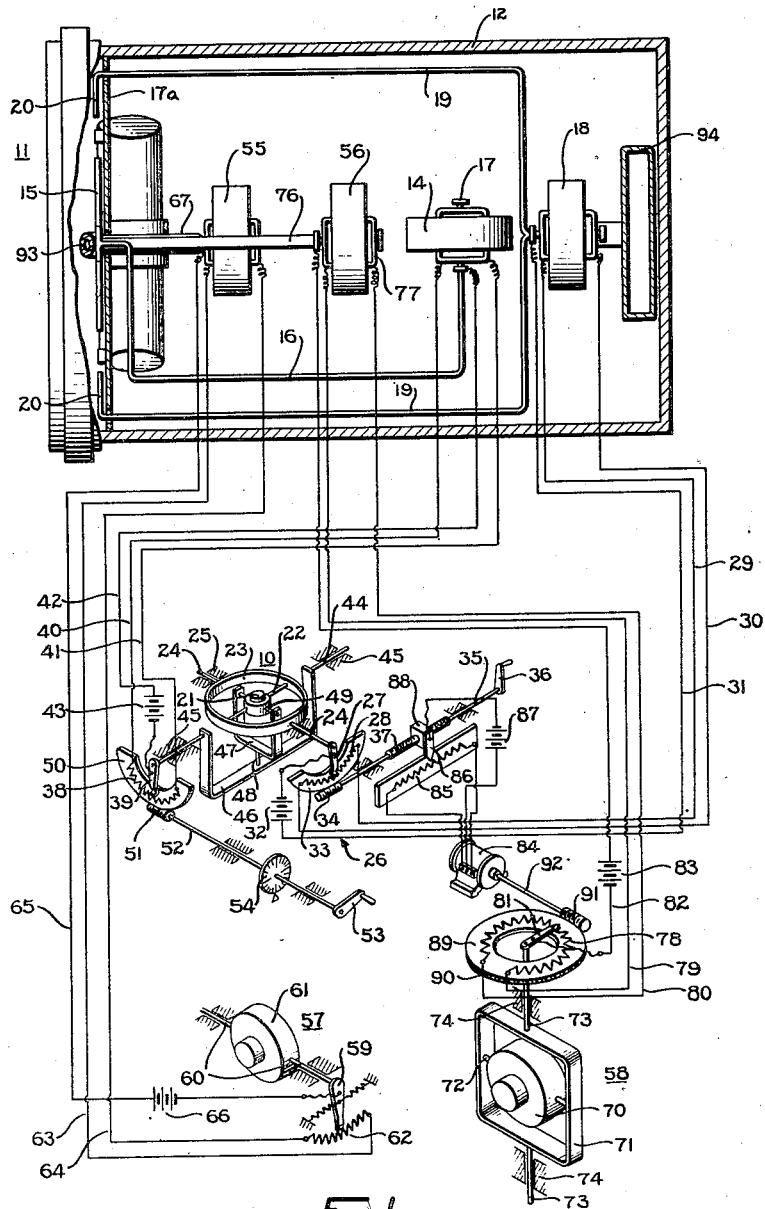
Figure 2:
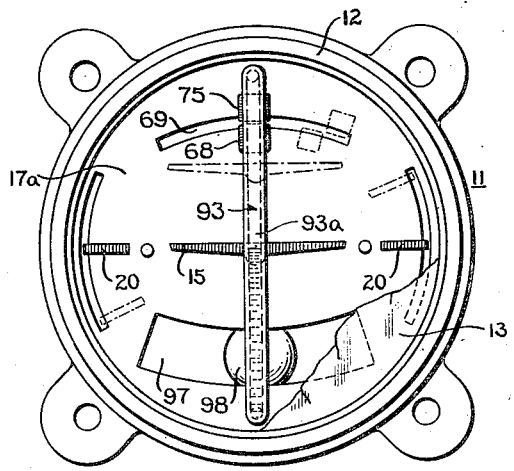
Fig. 2 is a front elevation of an indicating device employed in Fig. 1.
Figure 3:
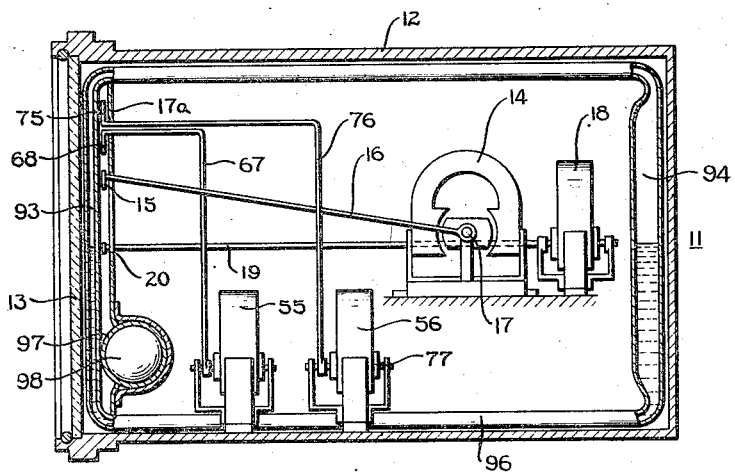
Fig. 3 is a longitudinal sectional view of the indicating device of Fig. 1.

In Fig. 1, a gyroscopic horizon 10 is provided for establishing a reference plane from which the movements of an aircraft can be measured. Suitable means for indicating the transverse and longitudinal inclinations of the craft are provided comprising an indicating apparatus 11, the latter also having means, to be later explained, for indicating the other quantities. The indicating device is constituted by a housing 12 having transparent face plate 13. The housing contains means 14 for controlling a wing silhouette 15, the position of which relative to a central reference line indicates the longitudinal inclination of the craft. The above mentioned means 14 are constituted, for example, by a rotary magnet which is operatively interconnected to the gyro horizon in a manner to appear hereinafter. The wing silhouette 15 is attached to an arm 16 which is angularly movable about an armature shaft 17 in such a manner that the silhouette 15 is movable substantially perpendicularly to a vertical diameter of an indicating face 11a of the indicating device. Means are also provided for controlling pointers which indicate the transverse inclination of the craft comprising, for example, a rotary magnet 18 which is substantially similar to magnet 14, with the exception that the armature of the magnet 18 is angularly shiftable about an axis which is perpendicular to that of magnet 14. To the armature of member 18 there is preferably rigidly attached arms 19, having, for example, integral therewith fingers 20 which are formed for movement over the face plate of the indicating apparatus whereby transverse inclinations of the craft are represented in a conventional manner.

The gyroscopic horizon 10 is constituted by a suitable rotor (not shown), having a housing 21 which is provided with trunnions 22, the latter being supported by a gimbal frame 23. Suitable trunnions 24 which rest upon bearings 25 are attached to the frame 23.

The operative interconnection between the horizon 10 and the rotary magnet 18 is constituted, e. g., by a potentiometer device 26 having, for example, a finger 27 which is rigidly attached to one of the trunnions 24 and adapted for movement therewith. The finger 27 is slidable over a resistance 28, the extremities of which are connected by leads 29 and 30 to the armature of rotary magnet 18. The finger 27 is also connected to said armature by lead 31, there being a source of electric energy 32 in the last mentioned lead.

In order to eliminate the necessity for a pilot making an estimate of the deviation of an indicating pointer, e. g., members 15 and 20, from a predetermined or desired position which is deflected or removed from a central or reference position, suitable means are provided for adjusting the indicating pointers whereby the latter can be moved from a deflected position to a centralized position when the craft is in an attitude in which the longitudinal and/or the transverse axes of the craft are inclined to the horizontal. In connection with the transverse inclination of the craft, said means are constituted by suitable apparatus for varying the position, for example, of the resistance 28 in such a manner that when finger 27 has moved relative to resistance 28 due to a transverse inclination of said craft, the resistance can be moved into its initial position relative to said finger. The resistance 28 is mounted upon a sector member 33, having conventional teeth upon the periphery thereof which are adapted for engagement with a worm 34, the latter being rotatable by means of a shaft 35 and a handle 36. The shaft 35 is provided with a threaded portion 37 for a purpose to appear later.

The horizon 10 is operatively connected to the rotary magnet 14 for indicating longitudinal inclinations of the craft by means of a potentiometer device analogous to the one previously described, comprising a resistance 38 over which a finger 39 is movable, the extremities of resistance 38 being connected to the rotary magnet 14 by means of leads 40 and 41. The finger 39 is connected to said magnet by a lead 42, there being an electric power source 43 connected therein. The finger 39 is preferably attached to one of a pair of trunnions 44 which rest in bearings 45, said trunnions being rigidly secured to a U-shaped member 46 to which is secured a second U-shaped member 47 by means, for example, of a rod 48. The housing 21 of the gyro is operatively associated with member 47 by means of trunnions 49, which are perpendicular to trunnions 22.

For a purpose above set forth, suitable means are provided in the operative interconnection between the gyro 10 and the rotary magnet 14 for adjusting the position of the wing silhouette 15, which is governed by said rotary magnet. The means comprise a sector element 50, upon which the resistance 38 is mounted, said sector having teeth upon the periphery thereof which mesh with a worm 51, the latter being rotatable by means of a shaft and handle 52 and 53 respectively. A calibrated disk 54 is fixed to the shaft 52 for measuring angular displacements of the latter.

There are mounted in the indicating device two additional rotary magnets 55 and 56 which are controlled respectively by a turn or bank indicating gyro 57, and a course gyro 58. The operative interconnection between gyro 57 and rotary magnet 55 is constituted, for example, by a potentiometer device having an angularly shiftable finger 59 which is preferably rigidly attached to one of two trunnions 60 of a housing 61 for the gyro 57. Finger 59 is movable over a resistance 62 which is connected at the extremities thereof to rotary magnet 55 by means of leads 63 and 64, the finger 59 also being connected to said magnet by a lead 65 which is in series with a power source 66. The armature of rotary magnet 55 is preferably perpendicular to face plate 11a. Attached to said armature and angularly shiftable therewith is an arm 67 having a finger 68 which is movable over the face plate, for example, within a suitable slot 69.

The course responsive device 58 is constituted by suitable means for establishing a reference direction comprising a gyro rotor (not shown) within a housing 70, which is supported in a gimbal frame 71 by means of horizontal trunnions 72. The frame 71 is supported in a conventional manner by vertical trunnions 73 which are mounted in bearings 74. The means operatively associated with the gyro 58 for indicating deviations of the craft from a desired course comprise an indicating pointer 75, which is controlled by means of the rotary magnet 56 which is preferably similar to rotary magnet 55, the armatures of said rotary magnets being coaxial. The indicating pointer 75 comprises a finger of an arm 76 which is angularly shiftable with an armature 77 of the rotary magnet 56. The latter is operatively connected with the course responsive device by means of a potentiometer apparatus, which is analogous to those above described, comprising a resistance 78, the extremities of which are connected to the last mentioned armature by means of leads 79 and 80. A finger 81 is slidable over resistance 78 and is preferably rigidly connected to one of the trunnions 73, said finger being electrically connected to the armature of the rotary magnet 56 by means of a lead 82, there being an electric power source 83 therein.

The indicating pointer 75 is angularly movable within the slot 69 in a path which is adjacent that of the movement of finger 68. Consequently, both the fingers 68 and 75 are movable within predetermined small angular limits. Suitable means are provided which are actuable as a function of the transverse inclination, and consequently as a function of the speed at which the craft turns, i. e., the speed at which course changes are made, for controlling the operative interconnection between the course gyro and the indicating pointer 75, whereby said pointer is maintained in a predetermined position relative to a suitable reference mark upon the face plate.

Said means are constituted by a motor 84, the speed and direction of rotation of which are controllable by means of another potentiometer arrangement comprising, for example, a fixedly mounted resistance 85 which is connected at the extremities thereof to the motor, and a finger 86 movable over said resistance, the finger being electrically connected to the motor by a suitable lead, there being a source of electric energy 87 in series therewith. The finger 86 is mounted upon a travelling nut 88, which in turn is engaged by the above mentioned threaded portion 37 upon shaft 35, the travelling nut being axially shiftable upon shaft 35 when the latter is rotated. The finger 86 is in a zero or centralized position upon the resistance 85 when the arm 27 is centralized relative to the resistance 28.

The resistance 78 is normally stationary relative to the finger 81 when the craft is in straight flight. Said resistance is mounted upon a circular element 89, having a toothed periphery 90 which is engaged by a worm 91, the latter being connected to the motor 84 by means of a shaft 92.

As an added safety precaution, the indicating apparatus is provided with mechanical inclinometers which act as a check for the electric inclinometers. A fore and aft or pitch indicator 93 is provided comprising a liquid-filled conduit system having a vertical transparent portion 93a which is visible adjacent the face plate 17a. The pitch indicator has a suitable liquid reservoir 94 which is connected to the vertical indicating portion 93a by means of conduits 95 and 96 at the upper and lower extremities of the reservoir, said liquid comprising, for example, colored alcohol. The portion 93a preferably extends through the space between the face plate 17a and the transparent disk 13. The level of the liquid is preferably coincident with a line through indicators 15 and 20 when the indicators are in a zero position. The portion 93a should also be parallel to and adjacent a vertical line through the indicating pointers 68 and 75 when the latter two are also in a zero position. An arcuate slot is provided, preferably adjacent the lower portion of face plate 17a through which is visible a conventional ball inclinometer 97 having a suitable ball 98 therein.

In operation, when the craft is climbing or descending, the longitudinal axis thereof must be inclined a predetermined amount relative to the reference plane, said amount being a function of the climbing or descending speed. The contact arm 39, being maintained in a true vertical by the gyroscopic horizon, is displaced relative to the resistance 38, thereby causing the wing silhouette upon the face plate of the indicating device to move away from a central zero position, e. g., when climbing the silhouette 15 will move upwardly relative to a horizontal diameter of the face of the indicator. For the purpose above mentioned, in order to restore the initial position of finger 39 relative to resistance 38, the latter is displaced by means of crank 53 in such a manner that in a desired climbing attitude the relative positions of the contact arm or finger 39 and the resistance 38 remain the same as in normal horizontal flight. Consequently, no deflection of the silhouette 15 occurs until the plane deviates from the desired climbing attitude.

In an analogous manner, it is necessary when flying in a curved path to adjust the resistance 28 in such a manner that the indicator 20 is deflected from its position only in the event of the aircraft deviating from the desired transverse inclination. If the correct course is followed in the curved flight path, the angle of bank of the craft must correspond to the angle between the true and the apparent vertical. The finger 27 is displaced to the extent of the above angle when following a correct curved path, said angle being a function of the product of the path speed and the angular speed of the craft. The initial relative positions of finger 27 and resistance 28 are restored by angularly shifting the shaft 35, for example, by the manually operable member 36. The readjustment of the position of resistance 28 causes a movement of the finger 86 away from its initial centralized position. The balance of the potentiometer arrangement, including said finger and resistance 86 and 85 respectively, is upset by said readjustment of the resistance 28. Consequently, the speed and direction of rotation of motor 84 is a function of the angle between the true and the apparent verticals when in curved flight, and if the aircraft changes course the motor 84 will maintain the proper relative positions between the finger 81 and the resistance 78, provided the speed at which course changes occur is correct. The indicating pointer 75 will thus remain in a predetermined desired position within the limits of slot 69 unless the said angular speed at which course changes occur becomes too great or too small.

There is thus provided novel means for indicating the attitude of aircraft when the latter is in curved flight or is climbing or descending. The novel means eliminates guess-work on the part of the pilot in steering a predetermined longitudinally inclined, or a curved course. The pilot, in order to maintain a correct flying attitude of an aircraft, needs to steer only in such a manner that the indicating pointers of the apparatus remain, for example, in their zero positions.

Although only one embodiment of the present invention has been illustrated and described in detail, it is to be expressly understood that the invention is not limited thereto. For example, the worm gear 34 can be adjusted in accordance with deflections of a speedometer, for example, a pressure speed indicator. Furthermore, it is possible to control shaft 35 from a remote point relative thereto by means of suitable apparatus, for example, a self-synchronous transmitter and receiver. Various changes can be made in the design and arrangement of the parts without departing from the spirit and scope of the invention as the same will now be understood by those skilled in the art. For a definition of the limits of the invention, reference will be had primarily to the appended claims.

What is claimed is:

1. An indicating device for aircraft, comprising a gyroscope for establishing a horizontal reference plane, means for indicating inclinations of said craft about one of its axes, a receiver for said indicating means, a transmitter operatively interconnecting the gyroscopic horizon and the receiver for actuating the indicating means, a directional gyro, an indicator for indicating deviations of the craft from a predetermined course established by said directional gyro, a receiver for said indicator, a transmitter operatively interconnecting the directional gyro and said second receiver for actuating said indicator, means connected with said second transmitter for setting the latter relative to said directional gyro, control means for the first-named transmitter for setting the latter relative to said gyroscope whereby said indicating means are moved to any desired indicating position during inclinations of said craft about said one axis, and means for interconnecting said control means with said second transmitter setting means for simultaneously operating said second transmitter to thereby cause said indicator to move as a function of the movement of said indicating means.

2. In combination, a horizon gyro, remote indicating means for indicating the bank of an aircraft, receiver means for said remote indicating means, first electrical transmission means connecting said horizon gyro and said receiver means for actuating the remote indicating means upon banking of said aircraft, a directional gyro, second remote indicating means for indicating the course of said aircraft, said second indicating means being in the same field of view with said first indicating means, receiver means for said second remote indicating means, second electrical transmission means connecting said directional gyro and said second receiver means for actuating the second remote indicating means upon deviation of said aircraft from its course, and setting means interconnecting said first and second electrical transmission means for simultaneously setting the same relative to their respective gyros to cause the first remote indicating means to move to any desired indicating position notwithstanding craft bank and to move the second remote indicating means as a function of the movement of said first remote indicating means.

3. An indicating device for aircraft, comprising means for establishing a horizontal reference plane, means for indicating inclination of the craft relative to said reference plane, means for operatively interconnecting the first two-named means whereby, upon a predetermined inclination of said craft relative to said reference plane, said indicating means are actuated to normally indicate said inclination, a directional gyro, an indicator for indicating deviations of sad craft from a predetermined course, a receiver for said indicator, a transmitter for operatively interconnecting the directional gyro and said receiver whereby, upon a deviation of said craft from a predetermined course, said indicator is actuated to normally indicate such deviation, means for setting said transmitter relative to said directional gyro, control means interposed in the operative connections between said reference establishing means and said indicating means for moving said indicating means to any desired position notwithstanding the inclination of sad craft whereby, upon a departure of said craft from said predetermined inclined flight, said indicating means departs from said last-named indicating position, and means for interconnecting said control means with said transmitter setting means for simultaneously controlling said transmitter to move the indicator to a new position as a function of the movement of said indicating means.

4. The combination with a gyroscopic horizon, of a first indicating means and a second indicating means, means connecting the gyroscopic horizon and the first indicating means for actuating the same as a function of the pitch of the vehicle, means connecting the gyroscopic horizon and the second indicating means for actuating the latter as a function of the bank of the vehicle, means for establishing a reference direction for said vehicle, an indicator connected with and actuated by said last-named means for normally indicating the direction of said vehicle, setting means for moving said indicator independently of said reference direction establishing means, control means associated with the connecting means between the gyroscopic horizon and the second indicating means for moving the second indicating means to any desired indicating position notwithstanding a predetermined bank of the vehicle, and means connecting said control means to the setting means whereby the indicator is moved simultaneously with the second indicating means as a function of the movement of said second indicating means.

PAUL EDUARD KOSTER.